United States Patent
Jubin et al.

(10) Patent No.: US 8,888,277 B2
(45) Date of Patent: Nov. 18, 2014

(54) CONTACT LENS WITH IMPROVED FITTING CHARACTERISTICS

(71) Applicant: Johnson & Johnson Vision Care, Inc., Jacksonville, FL (US)

(72) Inventors: Philippe F. Jubin, Fernandina Beach, FL (US); Radhakrishnan Damodharan, Jacksonville, FL (US); Timothy A. Clutterbuck, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 98 days.

(21) Appl. No.: 13/661,448

(22) Filed: Oct. 26, 2012

(65) Prior Publication Data

US 2014/0118683 A1 May 1, 2014

(51) Int. Cl.
*G02C 7/04* (2006.01)

(52) U.S. Cl.
CPC ........... *G02C 7/048* (2013.01); *G02C 7/049* (2013.01)
USPC .................................................... 351/159.36

(58) Field of Classification Search
CPC ........... G02C 7/04; G02C 7/048; G02C 7/049
USPC .......................................... 351/159.19, 159.36
See application file for complete search history.

(56) References Cited

U.S. PATENT DOCUMENTS

| 3,212,097 | A | 10/1965 | Adler |
| 4,549,794 | A | 10/1985 | Loshaek et al. |
| 5,485,228 | A | 1/1996 | Roffman et al. |
| 5,760,870 | A | 6/1998 | Payor et al. |
| 6,802,606 | B2 | 10/2004 | Roffman et al. |
| 7,004,585 | B2 | 2/2006 | Lindacher |
| 7,040,757 | B2 | 5/2006 | Hall et al. |
| 7,052,132 | B2 | 5/2006 | Ezekiel |
| 7,216,978 | B2 | 5/2007 | Perez et al. |
| 7,430,930 | B2 | 10/2008 | Zeller et al. |
| 7,543,935 | B2 | 6/2009 | Ezekiel |
| 2003/0151718 | A1 | 8/2003 | Marmo et al. |
| 2010/0171924 | A1 | 7/2010 | Perrin |
| 2012/0075581 | A1 | 3/2012 | Roffman et al. |

FOREIGN PATENT DOCUMENTS

| EP | 0651276 B1 | 9/1999 |
| WO | WO 2004/109368 A2 | 12/2004 |

OTHER PUBLICATIONS

European Search Report dated Jan. 14, 2014 for corresponding Application No. EP13190383.

*Primary Examiner* — Darryl J Collins
(74) *Attorney, Agent, or Firm* — Carl J. Evens

(57) ABSTRACT

A contact lens or pair of contact lenses may be designed such that the contact lens is circular or non-circular, planar or non planar, continuous or discontinuous, or any combination thereof to improve the fit of the contact lens on eye. This improved fit contact lens provides improved centration, improved rotation and/or translation and improved tear exchange on eye.

10 Claims, 4 Drawing Sheets

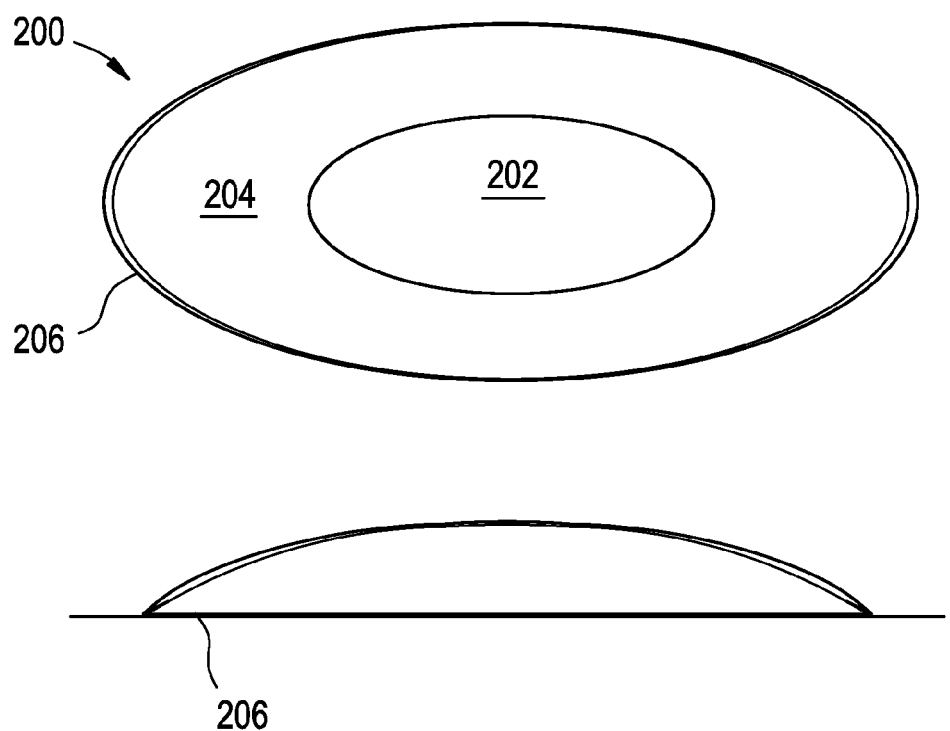

CONTACT LENS WITH IMPROVED FITTING CHARACTERISTICS

BACKGROUND OF THE INVENTION

1. Field of the Invention

The present invention relates to ophthalmic lenses, and more particularly to contact lenses designed with modified rims or edges that provide improved performance on eye, including improved centration, rotation, translation and tear exchange.

2. Discussion of the Related Art

Myopia or nearsightedness is an optical or refractive defect of the eye wherein rays of light from an image focus to a point before they reach the retina. Myopia generally occurs because the eyeball or globe is too long or the cornea is too steep. A minus or negative powered spherical lens may be utilized to correct myopia. Hyperopia or farsightedness is an optical or refractive defect of the eye wherein rays of light from an image focus to a point after they reach or behind the retina. Hyperopia generally occurs because the eyeball or globe is too short or the cornea is too flat. A plus or positive powered spherical lens may be utilized to correct hyperopia. Astigmatism is an optical or refractive defect in which an individual's vision is blurred due to the inability of the eye to focus a point object into a focused image on the retina. Astigmatism is caused by a non-rotationally symmetric curvature of the cornea. A normal cornea is spherical whereas in an individual with astigmatism, the cornea is not spherical. In other words, the cornea is actually more curved or steeper in one direction than another, thereby causing an image to be stretched out into two line foci rather than focused to a single point. A cylindrical lens rather than a spherical lens may be utilized to resolve astigmatism.

Contact lenses may be utilized to correct myopia, hyperopia, astigmatism as well as other visual acuity defects. Contact lenses may also be utilized to enhance the natural appearance of the wearer's eyes. Contact lenses or contacts are simply lenses placed on the anterior surface of the eye. Contact lenses are considered medical devices and may be worn to correct vision and/or for cosmetic or other therapeutic reasons. Contact lenses have been utilized commercially to improve vision since the 1950s. Early contact lenses were made or fabricated from hard materials, were relatively expensive and fragile. In addition, these early contact lenses were fabricated from materials that did not allow sufficient oxygen transmission through the contact lens to the conjunctiva and cornea which potentially could cause a number of adverse clinical effects. Although these contact lenses are still utilized, they are not suitable for all patients due to their poor initial comfort. Later developments in the field gave rise to soft contact lenses, based upon hydrogels, which are extremely popular and widely utilized today. Specifically, silicone hydrogel contact lenses that are available today combine the benefit of silicone, which has extremely high oxygen permeability, with the proven comfort and clinical performance of hydrogels. Essentially, these silicone hydrogel based contact lenses have higher oxygen permeabilities and are generally more comfortable to wear than the contact lenses made of the earlier hard materials.

Contact lenses may be broadly categorized as daily disposable contact lenses, frequent replacement contact lenses and traditional contact lenses. Daily disposable contact lenses, as the name implies, are worn for a single day and discarded. Cleaning solutions are not typically utilized with these lenses. Frequent replacement contact lenses include lenses that may be reused for two weeks up to one month depending on the manufacturer's and/or the doctor's recommendation and generally require cleaning and disinfection every day. There are even contact lenses that are approved for longer periods of reuse. Frequent replacement lenses also include extended wear contact lenses which may be kept on eye for up to a week. Traditional contact lenses or reusable contact lenses are worn for much longer periods and are typically discarded approximately every six months.

Corneal astigmatism may be corrected using a hard or rigid gas permeable contact lens. In this case, a fluid or tear lens may exist between the posterior surface of the rigid contact lens and the cornea. This fluid or tear lens follows or assumes the shape of the back surface of the contact lens. Since the index of refraction of the fluid or tear lens is nearly a match for the cornea, the corneal toricity is optically neutralized or reduced. In these cases, a toric lens will not be required. However, rigid gas permeable contact lenses and hard contact lenses are generally less comfortable than soft or hydrogel contact lenses. Since soft or hydrogel contact lenses wrap around the cornea, a fluid lens is generally not found and the tear fluid more closely resembles a thin film. In this case, a toric lens design is required.

A toric lens is an optical element having two different powers in two orientations that are perpendicular to one another. Essentially, a toric lens has one power, spherical, for correcting myopia or hyperopia and one power, cylinder, for correcting astigmatism built into a single lens. These powers are created with curvatures oriented at different angles which are preferably maintained relative to the eye. Toric lenses may be utilized in eyeglasses, intraocular lenses and contact lenses. The toric lenses used in eyeglasses and intraocular lenses are held fixed relative to the eye by either the spectacle frame or haptics thereby always providing optimal vision correction. However, toric contact lenses may tend to rotate on the eye thereby temporarily providing sub-optimal vision correction. Accordingly, currently utilized toric contact lenses also include a mechanism to keep the contact lens relatively stable on the eye when the wearer blinks or looks around. For many high order aberrations, many of which are not rotationally symmetric, positional stability is also required to provide optimal vision correction.

It is known that correction of certain optical defects may be accomplished by imparting non-rotationally symmetric corrective characteristics to one or more surfaces of a contact lens such as cylindrical, bifocal, multifocal, wavefront corrective characteristics or decentration of the optical zone. It is also known that certain cosmetic features such as print patterns, markings, and the like are required to be placed in a specific orientation relative to the wearer's eye. The use of contact lenses is problematic in that each contact lens of the pair must be maintained at a specific orientation while on the eye to be effective. When the contact lens is first placed on-eye, it must automatically position, or auto-position, itself and then maintain that position over time. However, once the contact lens is positioned, it tends to rotate on the eye due to the force exerted on the contact lens by the eyelids during blinking as well as eyelid and tear film movement.

Maintenance of the on-eye orientation of a contact lens typically is accomplished by altering the mechanical characteristics of the contact lens. For example, prism stabilization, including decentering of the contact lens' front surface relative to the back surface, thickening of the inferior contact lens periphery, forming depressions or elevations on the contact lens' surface, and truncating the contact lens edge, are all methods that have been utilized.

Additionally, static stabilization has been used in which the contact lens is stabilized by the use of thick and thin zones, or areas in which the thickness of the contact lens' periphery is increased or reduced, as the case may be. Typically, the thick and thin zones are located in the contact lens' periphery with symmetry about the vertical and/or horizontal axes. For example, each of two thick zones may be positioned on either side of the optic zone and centered along the 0-180 degree axis of the contact lens. In another example, a single thick zone positioned at the bottom of the contact lens providing a similar weight effect, like that of prism stabilization, but also incorporating a region of increasing thickness from top to bottom in order to utilize upper eyelid forces to stabilize the contact lens may be designed. It is important to note that the older technical literature utilizes the term dynamic stabilization for what we mean here as static stabilization. Accordingly, for purposes of this invention static and dynamic stabilization shall be utilized interchangeably.

The challenge with currently designed or utilized stabilization zones is a tradeoff between contact lens stability and comfort, plus the physical limitations associated with increased thickness. With a static or dynamic stabilization zone, the slope of the stabilization zone is fixed in the contact lens. Changes to the design to improve rotational speed, such as increasing the surface slope of the stabilization zone, also increases contact lens thickness and may adversely impact comfort. Additionally, the contact lens design has to accomplish two things; namely, to rotate to the proper orientation on insertion, and to maintain that orientation through the wear period. Conventional designs require tradeoffs in performance between these two modes.

In a newborn, the crystalline lens of the eye is somewhat soft and pliant making it extremely flexible and capable of a large degree of accommodation or focusing. As a person ages, the crystalline lens gradually becomes more rigid, and thus, their eyes are less able to accommodate, or bend the natural lens, to focus on objects that are relatively near to the observer. This condition is known as presbyopia.

A plus power lens may be utilized to restore the focusing power lost by the crystalline lens. The plus power lens may take the form of reading glasses, bifocal glasses or trifocal glasses. Reading glasses are easily utilized when an individual does not need refractive correction for distance. However, distant objects will be blurry when looking through reading glasses. If an individual is already wearing glasses for myopia, hyperopia and/or astigmatism, then the plus power may be added to the existing glasses in the form of a bifocal or trifocal lens. Contact lenses may also be worn to address presbyopia. In one type of such lenses, distance and near vision regions are concentrically arranged around the geometric center of the lens. Light passing though the optical zone of the lens is concentrated and focused at more than one point in the eye. These lenses are generally used in simultaneous vision mode. In simultaneous vision, portions of the lens optical zone focused for distance and near are available at the same time, focusing light from both object distances simultaneously. This is disadvantageous as image quality and image contrast may be degraded.

In another type of contact lens; namely, a segmented lens, near and distance vision regions are not concentric about the geometric center of the lens. The wearer of the segmented lenses is able to access the near vision region of the lens because the lens is constructed to allow it to translate, or move vertically relative to the pupil of the wearer's eye. This translating lens moves vertically when the person wearing the lens shifts their gaze downwardly, for example, to read. This upwardly positions the near vision portion in the center of the wearer's gaze. Substantially all of the light passing though the optical zone may be focused at a single point in the eye based on gaze.

One type of translating lens has a truncated shape. That is, unlike most lenses that are substantially continuously circular or oval, the lower portion of the truncated contact lens if flattened by cutting off or shortening that part of the lens. This results in a substantially flat, thick edge at the bottom of the lens. Exemplary descriptions of such lenses are set forth in a number of patents, including U.S. Pat. No. 7,543,935, U.S. Pat. No. 7,430,930, U.S. Pat. No. 7,052,132, and U.S. Pat. No. 4,549,794. However, a relatively flat edge on contact lenses such as these may tend to reduce comfort. It is therefore desirable to have a translating contact lens without this type of edge design thereby providing improved comfort.

Another type of translating lens has an outer shape which is continuously circular or oval, but comprises a substantially thickened portion peripheral to the central optical zone. This thickened portion is intended to contact the lower lid and positionally translate when the wearer looks down.

Exemplary references to such a lens are described in U.S. Pat. No. 7,040,757 and US Patent Publication No. 2010/0171924. In the exemplary embodiment set forth therein, the thickness in the peripheral portions of the lens outside the optical zone is substantially uniform for meridians parallel to the vertical meridian of the lens and which exhibits mirror symmetry with respect to a plane cutting though the vertical meridian.

U.S. Pat. No. 7,216,978 illustrates that the upper and lower eyelids do not move strictly in a vertical direction, with an up and down stroke during blinking. The upper lid moves substantially vertically, with a small nasal component during blinking, and the lower lid moves substantially horizontally, moving nasalward during blinking. Additionally, the upper and lower eyelids are not symmetrical with respect to a plane cutting though the vertical meridian. In other words, individuals do not blink symmetrically relative to a horizontal axis drawn between the open upper and lower lid. In addition, it is known that the eyes converge when the viewer gazes down to read. Accordingly, blinking in of itself may not result in the ideal translation of the contact lens.

In U.S. Pat. No. 6,802,606 and U.S. Pat. No. 5,485,228, binocular pairs are described as part of a simultaneous vision design. These examples illustrate concentric optical design with either a central disc having distance or full near power. This design would not perform as well as part of a translating lens. Essentially, these examples show rotationally symmetric designs which are intended to stay centered over the pupil to provide the optimal power ratio between distance and near. Accordingly, if these designs were translated, the power ratio between the distance and near segments would not be optimized. It is important to note however that while contact lenses with asymmetric optical zones are known, they are equally asymmetric in each eye and thus the full benefit may not be achieved.

In U.S. Pat. No. 7,004,585, the distance and near centers of a translating lens both lie on the vertical bisector of the optical zone. Once again, the potential disadvantage associated with this type of design is symmetry in the lens as well as between the eyes.

Contact lenses for presbyopia, astigmatism and other optical defects generally require non-optical features as described herein for positioning and maintaining the rotational orientation of the lens on eye. These features require certain tradeoffs, for example, comfort and fit for visual acuity.

Accordingly, there exists a need for contact lenses with improved on eye performance while maintaining a high degree of comfort.

SUMMARY OF THE INVENTION

The improved fit contact lens in accordance with the present invention overcomes the disadvantages associated with the prior art as briefly described above by altering the planarity of the lens outer edge, the overall shape of the lens, or both.

The present invention is directed to a contact lens design wherein the rim or edge of the contact lens ensures that the contact lens may be circular or non-circular combined with one of planar or non-planar and one of continuous or discontinuous. This improved fit contact lens provides improved centration, improved rotation and/or translation of the contact lens on eye and improved tear exchange. By modifying the rim or edge design of a contact lens, on eye orientation, for example with toric lenses, may be maintained without the need for stabilization zones or similar constructs. By modifying the rim or edge design of a contact lens, presbyopia may be addressed without the need for complicated, general fit translating contact lenses. By modifying the rim or edge design of a contact lens, differential pressure in the post-lens tear film may be obtained, thus improving tear exchange without the need to significantly modify the contact lens, thereby promoting improved clinical comfort. The rim shape may be optimized based on ocular anatomy, including eyelid geometry, eyelid tension, blink movement characteristics, and corneal/trans-limbal topography.

The improved fit contact lens of the present invention may be customized by populations, subpopulations/and/or individuals. The contact lenses may be manufactured utilizing existing technologies without any significant impact in cost over existing contact lenses, and in some cases, for example in planar designs, the process may be simplified and the cost reduced. The contact lenses of the present invention may be utilized with any type of contact lens optics without additional cost and optimized to improve clinical comfort and/or physiology.

BRIEF DESCRIPTION OF THE DRAWINGS

The foregoing and other features and advantages of the invention will be apparent from the following, more particular description of preferred embodiments of the invention, as illustrated in the accompanying drawings.

FIG. 2 is a top view and a side view of a second exemplary embodiment of a contact lens in accordance with the present invention.

DETAILED DESCRIPTION OF THE PREFERRED EMBODIMENTS

Figure 1A:
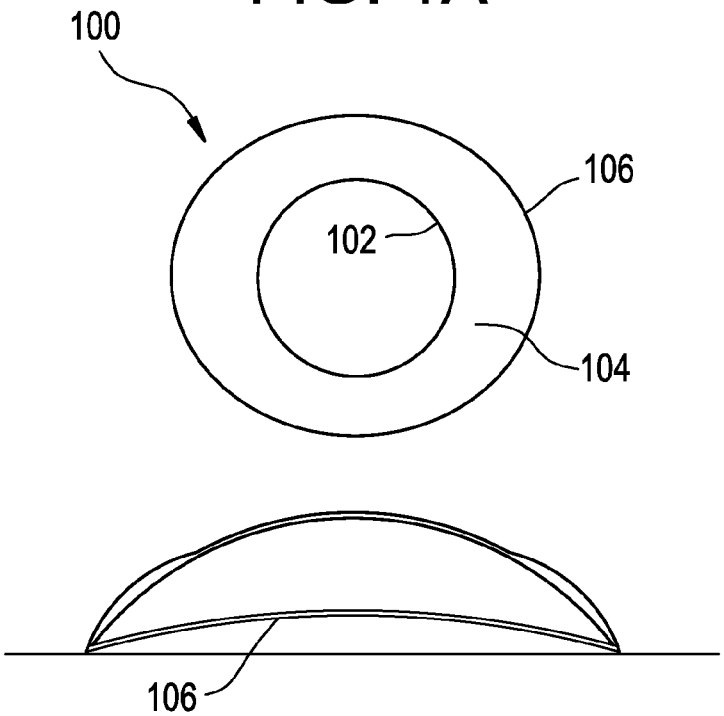
FIG. 1A is top view and a side view of a first exemplary embodiment of a contact lens in accordance with the present invention.

For purposes of the present invention a contact lens is defined by at least three distinct regions. The inner region from which the vision correction is obtained, the outer periphery of the contact lens that provides mechanical stability of the contact lens on eye, and an intermediate region located between the inner region and the outer region used for blending the two aforementioned regions in a smooth manner such that abrupt discontinuities do not occur.

The inner region or optical zone provides vision correction and is designed for a specific need such as single vision correction, astigmatism vision correction, bi-focal vision correction, multi-focal vision correction, custom correction or any other design that may provide vision correction. The outer periphery or peripheral zone provides for basic fit and stabilization of the contact lens on the eye including, centration and orientation. Orientation stabilization is fundamental when the optical zone includes non-rotationally symmetric features, such as astigmatic correction and/or high order aberrations correction. The intermediate region or zone ensures that the optical zone and the peripheral zone are blended smoothly. It is important to note that both the optical zone and the peripheral zone may be designed independently, though sometimes their designs are strongly related when particular requirements are necessary. For example, the design of a toric lens with an astigmatic optical zone might require a particular peripheral zone for maintaining the contact lens at a predetermined orientation on the eye.

For purposes of the present invention a contact lens is also defined by a front surface, a back surface or base curve and an edge. The front and back surface of the contact lens is described by at least three regions, the inner region from which the vision correction is obtained, the outer region or periphery of the contact lens that provides mechanical stability of the contact lens on eye, and an intermediate region located between the inner region and the outer region used for joining and/or blending the two aforementioned regions in a continuous and/or smooth manner such that discontinuities do not occur. The edge is the rim of the contact lens. For the purpose of the present invention, the shape of the edge may be described by four characteristics; namely, circularity, continuity, planarity and plane symmetry. The edge is said to be circular if the edge projection onto a given plane is a circle, otherwise the edge is said to be non-circular. The edge is said to be continuous if the edge is a curve that may be classified as at least a class C1 curve (continuous, first derivative), otherwise the edge is said to be discontinuous. The edge is said to be planar if it lies fully in a plane, or otherwise it is said to be non-planar. The edge has plane symmetry if the curve defining the edge is symmetrical with respect to a given plane, otherwise it is said to be non-planar symmetrical.

The present invention is directed to a contact lens design that comprises an edge or rim that provides improved performance on eye; namely, improved centration, rotation and/or translation of the contact lens on eye, and enhanced tear exchange. The edge or rim may comprise any suitable shape, for example, a specific geometric shape or an arbitrary shape. The edge or rim design may be optimized to improve clinical comfort and/or physiology by improving tear exchange on eye. The edge or rim design may be optimized based upon population or subpopulation averages. Alternately, the edge or rim design may be based on customized data from a specific individual.

The present invention embodies a number of novel design aspects or features. In one exemplary embodiment, the shape of the outer circumference of the lens (the edge or rim) is non-continuous or continuous. These designs may be particularly important in accounting for eye lid geometry and blinking characteristics. In another exemplary embodiment of the invention, the shape of the outer circumference of the lens, the edge or rim, is either non-circular or circular.

In another exemplary embodiment of the invention, the depth of the contact lens along the Z axis, which is generally defined as the continuation of a line extending from the center of the front surface to the center of the back surface, is either unequal (non-planar), or equal (planar).

In accordance with another exemplary embodiment of the invention, the shape of the circumference of the lens may be symmetric about the horizontal and vertical axis, or asymmetric about the horizontal or the vertical or both axes. In accordance with another exemplary embodiment of the invention, a combination of the above edge design features may be utilized in the same lens.

The contact lens edge or rim may be designed having a non-circular shape wherein the ratio of the major and minor diameters may be optimized based on the astigmatic correction required for a toric product. The diameter ratio may also be varied as a function of the axis in addition to the cylinder power described above. The diameter ratio may also be optimized to provide the desired on eye translation. A combination of the diameter ratio plus the lens thickness may be optimized for both orientation and translation. The edge or rim shape may also be optimized based on ocular anatomy, including eyelid position, eyelid tension, blink movement characteristics and corneal/trans-limbal topography.

Figure 1B:
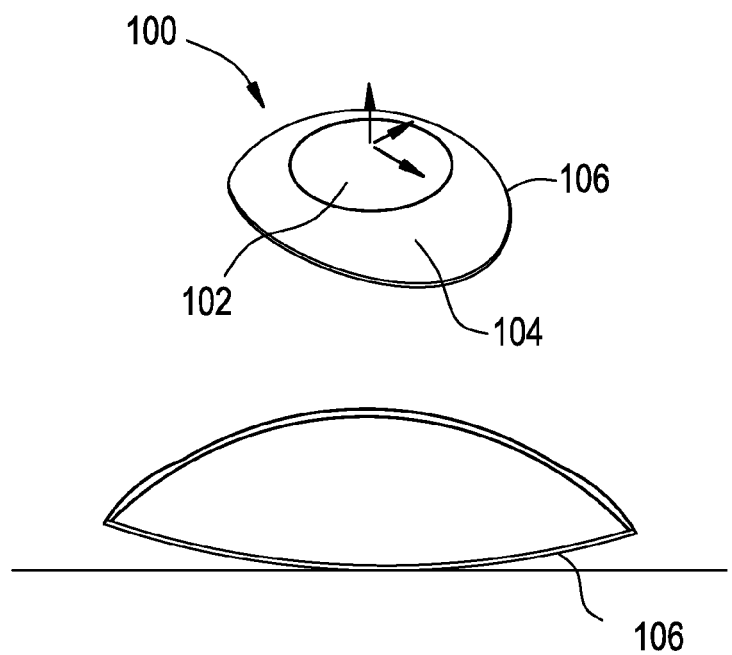
FIG. 1B is a top view and a side view of the contact lens illustrated in FIG. 1A rotated ninety degrees.

In accordance with one exemplary embodiment, the contact lens may be designed with an edge or rim that is continuous, non-circular and non-planar. FIG. 1A illustrates a top view and a side view of a contact lens 100 in accordance with the exemplary embodiment and FIG. 1B illustrates a top view and a side view of the contact lens 100 of FIG. 1A rotated ninety (90) degrees. The contact lens 100 comprises a substantially circular optic zone 102 and a peripheral zone 104 surrounding the optic zone 102. It is important to note that in this exemplary embodiment as well as all exemplary embodiments described herein, the optic zone 102 may comprise a geometry substantially equivalent to the geometry of the peripheral zone 104 rather than simply circular. The edge or rim 106 of the lens 100 is non-circular and may comprise any suitable shape, including a custom shape for a particular eye. As illustrated, the contact lens 100 is a non-planar, only making contact with a flat surface at certain locations. This exemplary design offers a number of potential advantages, including improved fit, improved rotation and centration on eye and improved tear film exchange.

The exemplary, continuous, non-circular and non-planar contact lens 100 may be designed with symmetric horizontal and vertical axes, asymmetric horizontal or asymmetric vertical axis, or asymmetric horizontal and vertical axes. The contact lens 100 may be designed with an optimized major/minor diameter ratio for orientation, with an optimized major/minor diameter ratio for translation, with optimized diameter and lens thickness for orientation, with optimized diameters and lens thickness for translation, with optimized symmetry or asymmetry based upon intended use or fitting population, with optimized rim shape for eye physiology and/or with optimized shape and aspect based upon ocular anatomy, including lid portion, lid tension, blank movement characteristics, corneal and trans-limbal topography. The contact lens 100 may be utilized for any number of indications, including lenses requiring improved centration, improved orientation, improved translation and improved clinical findings, for example, comfort and/or physiology. The exemplary contact lens 100 may include a design based upon population or subpopulation averages and/or with a design based upon data from an individual; namely, a custom lens.

In accordance with another exemplary embodiment, the contact lens may be designed with an edge or rim that is continuous, non-circular and planar. FIG. 2 illustrates a top view and a side view of a contact lens 200 in accordance with this exemplary embodiment. The contact lens 200 comprises an optic zone 202 surrounded by a peripheral zone 204. Once again, it is important to note that in this exemplary embodiment as well as all exemplary embodiments described herein, the optic zone 202 may comprise a geometry substantially equivalent to the geometry of the peripheral zone 204. The edge or rim 206 of the lens 200 is non-circular and may comprise any suitable shape, including a custom shape for a particular eye. As illustrated, the contact lens 200 is planar, making contact with a flat surface at all locations around its edge 206. The rim 206 shape, being non-circular may be any defined shape or may be arbitrary in nature, but is made planar by controlling the edge and the back surface or curve geometry of the lens. Like the previously described exemplary embodiment, this exemplary design offers a number of potential advantages, including improved fit, improved rotation and centration on eye and improved tear film exchange. In addition, this exemplary contact lens 200 with its planar construction offers easier manufacturability.

The exemplary, continuous, non-circular and planar contact lens 200 may be designed with symmetric horizontal and vertical axes, asymmetric horizontal or asymmetric vertical axis, or asymmetric horizontal and vertical axes. The contact lens 200 may be designed with an optimized major/minor diameter ratio for orientation, with an optimized major/minor diameter ratio for translation, with optimized diameter and lens thickness for orientation, with optimized diameters and lens thickness for translation, with optimized symmetry or asymmetry based upon intended use or fitting population, with optimized rim shape for eye physiology and/or with optimized shape and aspect based upon ocular anatomy, including lid portion, lid tension, blank movement characteristics, corneal and trans-limbal topography. The contact lens 200 may be utilized for any number of indications, including lenses requiring improved centration, improved orientation, improved translation and improved clinical findings, for example, comfort and/or physiology. The exemplary contact lens 200 may include a design based upon population or subpopulation averages and/or with a design based upon data from an individual; namely, a custom lens.

Figure 3:
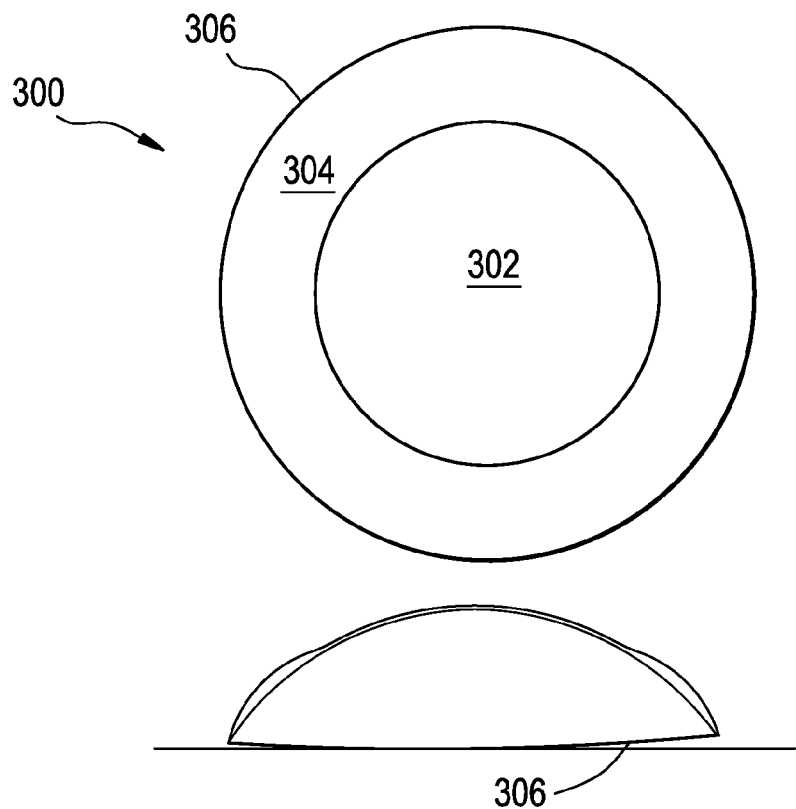
FIG. 3 is a top view and a side view of a third exemplary embodiment of a contact lens in accordance with the present invention.
Figure 3A:
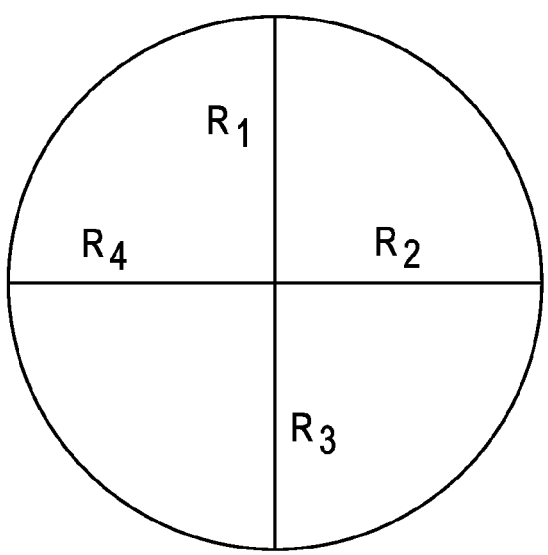
FIG. 3A is a top view of the contact lens of FIG. 3A illustrating the lens constructed with four different radii in accordance with the present invention.

In accordance with yet another exemplary embodiment, the contact lens may be designed with an edge or rim that is continuous, circular and non-planar. FIG. 3 illustrates a top view and a side view of a contact lens 300 in accordance with this exemplary embodiment. The contact lens 300 comprises a substantially circular optic zone 302 and a peripheral zone 304 surrounding the optic zone 302. It is important to note that in this exemplary embodiment as well as all exemplary embodiments described herein, the optic zone 302 may comprise a geometry substantially equivalent to the geometry of the peripheral zone 104 rather than simply circular. The edge or rim 306 of the lens 300 is circular and non-planar, only making contact with a flat surface at certain locations. The rim 306 shape is circular, but is made to be non-planar by controlling the edge 306 of the contact lens 300 and the back surface geometry of the lens 300. For example, referring to FIG. 3A, there is illustrated a top view of the contact lens 300 having four different radii, $R_1$, $R_2$, $R_3$ and $R_4$. In this exemplary embodiment, the rim 306 may be non-planar by making the radii unequal, such as given by $$R_1 \neq R_2 \neq R_3 \neq R_4.$$

Although illustrated with four quadrants, it is important to note that the contact lens 300 may be made with any number of sections to create the desired non-planar surface. This exemplary design offers a number of potential advantages, including improved fit, improved rotation and centration on eye and improved tear film exchange.

The exemplary, continuous, circular and planar contact lens 300 may be designed with symmetric horizontal and vertical axes, asymmetric horizontal or asymmetric vertical axis, or asymmetric horizontal and vertical axes. The contact lens 300 may be designed with an optimized major/minor diameter ratio for orientation, with an optimized major/minor diameter ratio for translation, with optimized diameter and lens thickness for orientation, with optimized diameters and lens thickness for translation, with optimized symmetry or asymmetry based upon intended use or fitting population, with optimized rim shape for eye physiology and/or with optimized shape and aspect based upon ocular anatomy, including lid portion, lid tension, blank movement characteristics, corneal and trans-limbal topography. The contact lens 300 may be utilized for any number of indications, including lenses requiring improved centration, improved orientation, improved translation and improved clinical findings, for example, comfort and/or physiology. The exemplary contact lens 300 may include a design based upon population or subpopulation averages and/or with a design based upon data from an individual; namely, a custom lens.

Figure 4A:
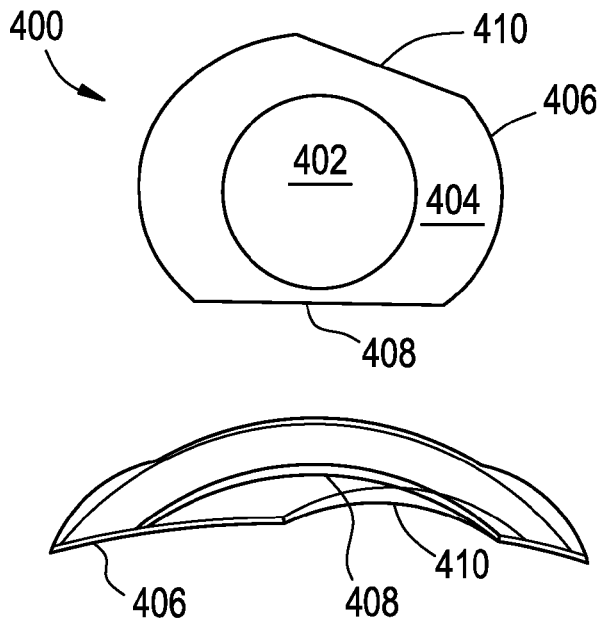
FIG. 4A is a top view and a side view of a fourth exemplary embodiment of a contact lens in accordance with the present invention.
Figure 4B:
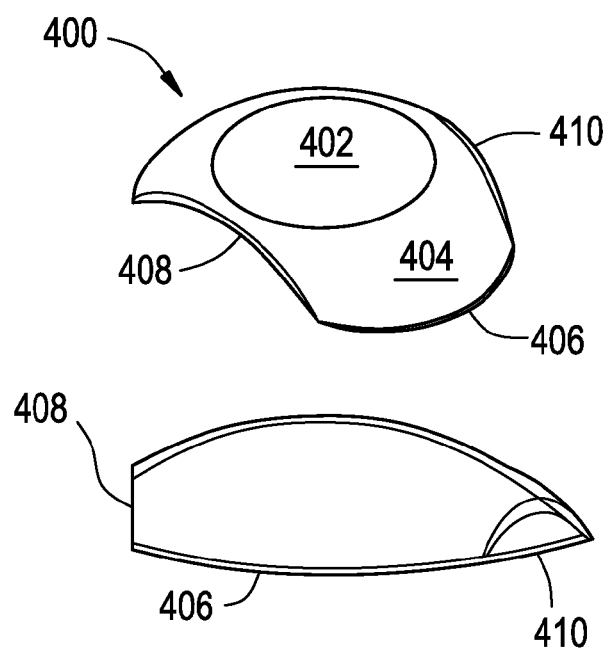
FIG. 4B is a top view and a side view of the contact lens illustrated in FIG. 4A rotated to show particular features.

In accordance with still yet another exemplary embodiment, the contact lens may be designed with an edge or rim that is discontinuous, non-circular and non-planar. FIG. 4A illustrates a top view and a side view of a contact lens 400 in accordance with this exemplary embodiment and FIG. 4B illustrates a top view and a side view of the contact lens 400 of FIG. 4A rotated to show the discontinuities. The contact lens 400 comprises a substantially circular optic zone 402 and a peripheral zone 404 surrounding the optic zone 402. It is important to note that in this exemplary embodiment as well as all exemplary embodiments described herein, the optic zone 402 may comprise a geometry substantially equivalent to the geometry of the peripheral zone 404 rather than simply circular. The edge or rim 406 of the lens 400 is non-circular and may comprise any suitable shape, including a custom shape for a particular eye. In addition, the rim 406 of the lens 400 also comprises discontinuities 408 and 410. Essentially, these discontinuities are missing sections of the contact lens 400. In the contact lens art, they are truncations and may be posited at any suitable location on the lens in order to optimize orientation, translation and stabilization. In other words, the discontinuous nature of the rim 406 may be optimized to provide the necessary movement on eye to achieve better performance with respect to orientation, translation and stabilization. The discontinuities 408 and 410 are utilized to optimize lens fit, especially with eyelid interaction. Although two discontinuities 408 and 410 are illustrated, any number of discontinuities may be utilized. As illustrated, the contact lens 400 is also non-planar, only making contact with a flat surface at certain locations. This exemplary design offers a number of potential advantages, including improved fit, improved rotation and centration on eye and improved tear film exchange.

In this exemplary embodiment, the contact lenses may be paired as a matched set of right and left pair of lenses.

The exemplary, discontinuous, non-circular and planar contact lens 400 may be designed with symmetric horizontal and vertical axes, asymmetric horizontal or asymmetric vertical axis, or asymmetric horizontal and vertical axes. The contact lens 400 may be designed with an optimized major/minor diameter ratio for orientation, with an optimized major/minor diameter ratio for translation, with optimized diameter and lens thickness for orientation, with optimized diameters and lens thickness for translation, with optimized symmetry or asymmetry based upon intended use or fitting population, with optimized rim shape for eye physiology and/or with optimized shape and aspect based upon ocular anatomy, including lid portion, lid tension, blank movement characteristics, corneal and trans-limbal topography. The contact lens 400 may be utilized for any number of indications, including lenses requiring improved centration, improved orientation, improved translation and improved clinical findings, for example, comfort and/or physiology. The exemplary contact lens 400 may include a design based upon population or subpopulation averages and/or with a design based upon data from an individual; namely, a custom lens.

The edge or rim of the lens may be described using mathematical equations or alternatively using a series of points in space; namely, a Point Cloud. It is important to note that any number of mathematical equations or expressions may be utilized in accordance with the present invention. In addition, while the equations given below generally correspond to the rim shapes illustrated in the Figures, the exemplary embodiments illustrated in the Figures are representations of the shapes and are not necessarily generated from the equations.

An example of mathematical equation suitable to describe a rim that is continuous, non-circular and non-planar, corresponding to the first exemplary embodiment, is given by $$\begin{cases} R = d + dt \times (\text{Cos}(t + a)^3 + \text{Sin}(t + a)^3) \\ Z = s + st \times (\text{Cos}(t + a)^3 + \text{Sin}(t + a)^3), \end{cases} \quad \text{Eq. 1}$$

where (R,t,Z) are the polar coordinates of the rim and d, dt, a, s and st are constants used to optimize the shape the rim.

An example of mathematical equation suitable to describe a rim that is continuous, non-circular and planar, corresponding to the second exemplary embodiment, is given by $$\begin{cases} R = d + dt \times (\text{Cos}(t + a)^3 + \text{Sin}(t + a)^3) \\ Z = s, \end{cases} \quad \text{Eq. 2}$$

where (R,t, Z) are the polar coordinates of the rim and d, dt, a and, s are constants used to optimize the shape the rim. In this case, the rim lies in a plane of equation Z=s.

An example of mathematical equation suitable to describe a rim that is continuous, circular and non-planar, corresponding to the third exemplary embodiment is given by $$\begin{cases} R = d \\ Z = s + st \times \text{Sin}(t + a), \end{cases} \quad \text{Eq. 3}$$

where (R,t, Z) are the polar coordinates of the rim and d, a, s and st are constants used to optimize the shape the rim.

An example of mathematical equation suitable to describe a rim that is discontinuous, non-circular and non-planar, corresponding to the fourth exemplary embodiment is given by $$\begin{cases} R = d + dt \times (\text{Cos}(t+a)^3 + \text{Sin}(t+a)^3), \forall t \in [t1, t2] \\ R = a + p + (\text{Sin}(t+a) - m \times \text{Cos}(t+a)), \forall t \notin [t1, t2] \\ Z = s + st \times (\text{Cos}(t+a)^3 + \text{Sin}(t+a)^3) \end{cases} \quad \text{Eq. 4}$$

where (R,t, Z) are the polar coordinates of the rim and d, dt, a, s, st, a, p, m, t1 and t2 are constants used to optimize the shape the rim.

Although above equations are noted in polar coordinates, any suitable coordinate system could be used to describe the shape of the rim.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. A contact lens, the lens comprising:
an inner optic zone configured for eye enhancement;
an outer peripheral zone surrounding the inner optic zone and configured for providing mechanical stability for the contact lens on eye; and
a lens rim along the outer peripheral zone, the lens rim being configured for at least one of improved centration, rotation, translation and tear exchange, the lens rim being continuous, non-circular and planar, the optic zone being non-circular and having the shape of the lens rim.

2. The contact lens according to claim 1, wherein the contact lens comprises a soft contact lens.

3. The contact lens according to claim 1, wherein the contact lens is configured to correct for astigmatism.

4. The contact lens according to claim 1, wherein the contact lens is configured to correct for presbyopia.

5. A contact lens, the lens comprising:
an inner optic zone configured for eye enhancement;
an outer peripheral zone surrounding the inner optic zone and configured for providing mechanical stability for the contact lens on eye; and
a lens rim along the outer peripheral zone, the lens rim being configured for at least one of improved centration, rotation, translation and tear exchange, the lens rim being continuous, circular and non-planar.

6. The contact lens according to claim 5, wherein the contact lens comprises a soft contact lens.

7. The contact lens according to claim 5, wherein the contact lens is configured to correct for astigmatism.

8. The contact lens according to claim 5, wherein the contact lens is configured to correct for presbyopia.

9. The contact lens according to claim 5, wherein the optic zone is non-circular.

10. The contact lens according to claim 5, wherein the optic zone has the shape of the lens rim.

* * * * *